H. C. STUTZ.
STEERING HEAD FOR AUTOMOBILES.
APPLICATION FILED DEC. 24, 1907.
911,777.
Patented Feb. 9, 1909.
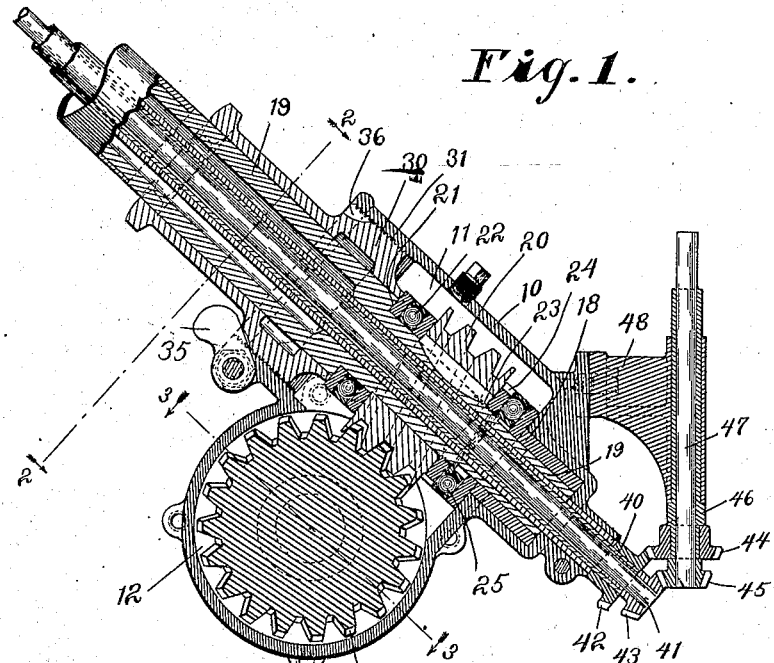
*Fig. 1.*
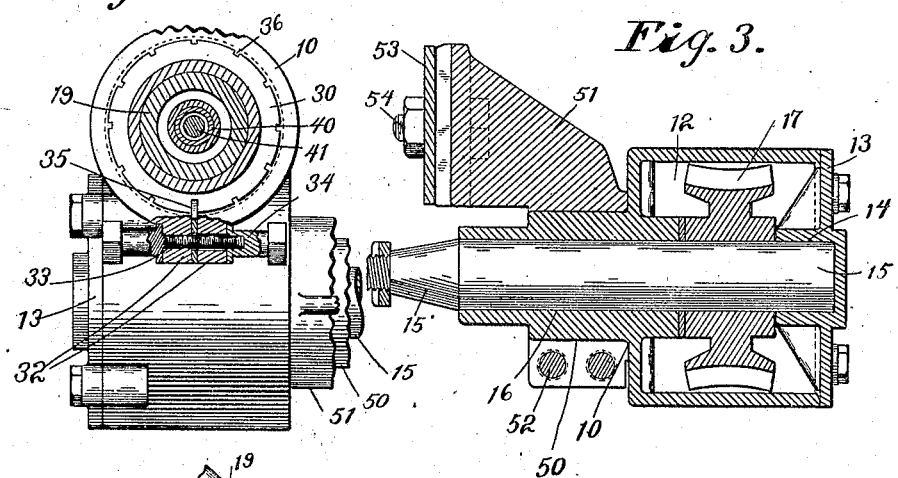
*Fig. 2.*     *Fig. 3.*
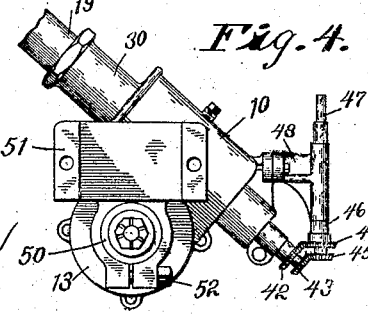
*Fig. 4.*
Witnesses
Karl Clendening,
Thomas H. McWeand
Inventor
Harry C. Stutz,
By Bradford Hood
Attorneys

UNITED STATES PATENT OFFICE.

HARRY C. STUTZ, OF INDIANAPOLIS, INDIANA.

STEERING-HEAD FOR AUTOMOBILES.

No. 911,777.

Specification of Letters Patent.

Patented Feb. 9, 1909.

Application filed December 24, 1907. Serial No. 407,944.

*To all whom it may concern:*

Be it known that I, HARRY C. STUTZ, a citizen of the United States, residing at Indianapolis, in the county of Marion and State of Indiana, have invented certain new and useful Improvements in Steering-Heads for Automobiles, of which the following is a specification.

The object of my invention is to produce a steering head for automobiles having certain improvements and details of construction by means of which ease of operation may be insured and by means of which it may be made readily attachable to machines of different makes and any desired angle of steering head readily obtained.

The accompanying drawings illustrate my invention.

Figure 1 is a central vertical section of the lower end of a steering head constructed in accordance with my invention. Fig. 2 a section on line 2—2 of Fig. 1. Fig. 3 a section on line 3—3 of Fig. 1 with the attaching bracket swung to an abnormal position in order to show its details of construction. Fig. 4 a side elevation, on a smaller scale, of the parts shown in Fig. 1.

In the drawings 10 indicates a suitable main casing, having a substantially cylindrical chamber 11 and another substantially cylindrical chamber 12 lying at right angles to chamber 11 and intersecting same. The outer end of chamber 12 is closed by a suitable cap having a socket bearing 14 adapted to receive one end of the steering shaft 15 journaled in bearing 16 formed in the main casing 10, said shaft 15 having one end 15' projected beyond the casing and adapted to receive a suitable lever (not shown) to which the steering wheels will be connected in the usual manner. Secured to shaft 15 within chamber 12 is an ordinary worm gear 17. At the lower end of chamber 11, I provide a bearing bushing 18 adapted to receive the lower end of a hollow steering column 19 to which is keyed a worm 20 adapted to mesh with the worm gear 17. Shaft 19 is provided with a shoulder 21 against which lies one track of a thrust bearing 22 the other track of said bearing forming an abutment for the worm 20 and, in order to hold the worm 20 in place axially, I provide shaft 19 at an intermediate point with threads 23 adapted to receive the track 24 of a thrust bearing 25, the threads 23 being of the same direction as worm 20 and the pitch of the worm is in such direction, that, when turned so as to produce a thrust upon the track 24 the resultant on the said track will tend to turn it upon its threads 23 against the worm.

In order to form an abutment for the outer track of bearing 22, I provide a bushing 30 in which shaft 19 is journaled and this bushing is provided with external threads adapted to be received by threads 31 formed in the outer upper end of chamber 11, said upper end being slit longitudinally at one point and provided with a pair of clamping ears 32 through one of which a clamping screw 33 is threaded, said clamping screw being passed freely through the opposing ear 32 into a clamp nut 34 which engages said opposing ear. Arranged between the two ears 32 and journaled upon screw 33 is a locking tongue 35 adapted to be swung into any one of a series of shallow notches 36 formed radially in the circumference of the threaded portion of the bushing 30, so that said bushing is held against turning in the casing not only by the clamping of the casing upon the bushing but also by the tongue 35 lying in one of the notches 36 and being itself clamped against turning by the clamp members 33—34.

Journaled in the hollow shaft 19 and extending therethrough, in the usual well known manner, is a hollow shaft 40 and another shaft 41, which, in the usual well known manner, are equipped with gears 42 and 43 respectively which mesh with gears 44 and 45 respectively of shafts 46 and 47 respectively, which shafts are carried in a bracket 48 attached to casing 10 and which shafts are adapted to receive arms or levers to be connected to the throttle valve and spark controller in the usual well known manner and hence not shown.

Concentric with the bearing 16 and shaft 15, and extending from one end of chamber 12 of casing 10 is a circular boss 50 upon which is journaled an attaching bracket 51, that portion of the bracket 51 which encircles boss 50 being split as clearly shown in Fig. 4, and having a clamping screw or screws 52 by means of which the bracket may be tightly clamped in any desired angular position upon boss 50. Bracket 51 is adapted to be attached to the frame 53 by suitable bolts 54 the arrangement being such that said bracket may be readily attached to the chassis frame and the steering head then given any desired angle by rocking boss 50 in the bracket to the desired point and then securing the parts rigidly in place by means of the clamp screws 52.

I claim as my invention:

1. In a steering head, the combination, with a worm wheel, a worm meshing therewith, and a shaft carrying said worm, of a pair of thrust bearings arranged at opposite ends of the worm to take the thrust thereof, one of said thrust bearings having one of its members threaded upon said shaft to serve as a retaining member for the worm, the direction of pitch of the threads being such that the thrust of the worm thereon will serve to tighten said retaining member on the worm, and abutments for said thrust bearings.

2. A steering head comprising a main casing, a worm gear journaled therein, a steering column also journaled therein and having a shoulder, a worm keyed upon said column and engaging said shoulder, a thrust-bearing track threaded upon said column and engaging the worm to hold the same against said shoulder, said track being threaded upon the column in such direction that the thrust of the worm on said track will tend to tighten the track on the worm, a thrust-bearing coöperating with said track and abutting against the casing, and an abutment for the opposite end of the worm.

3. A steering head comprising a main casing, a worm gear journaled therein, a steering column also journaled therein and having a shoulder, a thrust-bearing track threaded upon said column and engaging the worm to hold the same against said shoulder, said track being threaded upon the shaft in such direction that the thrust of the worm on said track will tend to tighten the track on the worm, a thrust-bearing coöperating with said track and abutting against the casing, an abutment for the opposite end of said worm threaded into the split threaded end of the casing and having a plurality of notches 36, a clamping screw for the split end of the casing, and a retaining tongue journaled on said screw in the split of the casing and adapted to enter the notches 36, substantially as and for the purpose set forth.

4. In a steering head, the combination, of the main casing, a steering shaft journaled therein, said casing having a circular sleeve surrounding said steering shaft, a bracket mounted on said sleeve and within which said sleeve may be angularly adjusted, and means for normally preventing angular movement of the sleeve within the bracket.

5. In a steering head, the combination, of the main casing, a steering shaft journaled therein, means for rocking said steering shaft, a sleeve surrounding said shaft and forming part of the main casing, a supporting bracket journaled on said sleeve by a split collar, and a means for clamping said split collar upon the sleeve.

In witness whereof, I have hereunto set my hand and seal at Indianapolis, Indiana.

HARRY C. STUTZ. [L. S.]

Witnesses:
FRANK A. FAHLE,
THOMAS W. McMEANS.